(12) United States Patent
Cernohous et al.

(10) Patent No.: US 12,371,581 B2
(45) Date of Patent: Jul. 29, 2025

(54) HIGH PERFORMANCE WATER SOLUBLE POLYMER COMPOSITIONS

(71) Applicant: Infinite Material Solutions, LLC, Prescott, WI (US)

(72) Inventors: Jeffrey Jacob Cernohous, Hudson, WI (US); Nathan Ockwig, Eagan, MN (US); Gavriel DePrenger-Gottfried, Woodbury, MN (US)

( * ) Notice: Subject to any disclaimer, the term of this patent is extended or adjusted under 35 U.S.C. 154(b) by 510 days.

(21) Appl. No.: 17/210,235

(22) Filed: Mar. 23, 2021

(65) Prior Publication Data

US 2021/0301161 A1  Sep. 30, 2021

Related U.S. Application Data

(60) Provisional application No. 62/994,446, filed on Mar. 25, 2020.

(51) Int. Cl.
| | | |
|---|---|---|
| *B32B 3/10* | (2006.01) |
| *B29C 64/314* | (2017.01) |
| *B33Y 40/10* | (2020.01) |
| *B33Y 70/00* | (2020.01) |
| *C09D 11/106* | (2014.01) |
| *C09D 11/14* | (2006.01) |

(52) U.S. Cl.
CPC .......... *C09D 11/106* (2013.01); *B29C 64/314* (2017.08); *B33Y 40/10* (2020.01); *B33Y 70/00* (2014.12); *C09D 11/14* (2013.01); *B29K 2039/06* (2013.01); *B29K 2995/004* (2013.01)

(58) Field of Classification Search
None
See application file for complete search history.

(56) References Cited

U.S. PATENT DOCUMENTS

| | | |
|---|---|---|
| 3,288,770 A | 11/1966 | Butler |
| 3,556,932 A | 1/1971 | Anthony et al. |
| 5,121,329 A | 6/1992 | Crump |
| 5,503,785 A | 4/1996 | Serdy et al. |
| 5,518,680 A | 5/1996 | Cima et al. |
| 5,603,884 A | 2/1997 | DuCharme, Jr. et al. |
| 5,869,170 A | 2/1999 | Cima et al. |
| 5,993,716 A | 11/1999 | Draenert |
| 6,070,107 A | 5/2000 | Lombardi et al. |
| 6,228,923 B1 | 5/2001 | Lombardi et al. |
| 6,235,816 B1 | 5/2001 | Lorcks et al. |
| 6,547,994 B1 | 4/2003 | Monkhouse et al. |
| 6,585,930 B2 | 7/2003 | Liu et al. |

(Continued)

FOREIGN PATENT DOCUMENTS

| | | |
|---|---|---|
| CN | 106279817 A | 1/2017 |
| EP | 0691194 A1 | 1/1996 |

(Continued)

OTHER PUBLICATIONS

International Search Report and Written Opinion for Application No. PCT/US2018/034738, mailed Sep. 4, 2018 (12 pgs).

(Continued)

*Primary Examiner* — Christopher M Polley
(74) *Attorney, Agent, or Firm* — Madison C. Makeever (57) ABSTRACT

A water soluble polymer composition comprising a water soluble polymer (e.g., polyvinyl alcohol-co-vinylpyrrolidinone (PVOH-co-PVP)) and a sugar (e.g., trehalose).

22 Claims, 5 Drawing Sheets

(56) References Cited

U.S. PATENT DOCUMENTS

| | | | |
|---|---|---|---|
| 6,673,285 B2 | 1/2004 | Ma | |
| 6,790,403 B1 | 9/2004 | Priedeman, Jr. et al. | |
| 7,087,200 B2 | 8/2006 | Taboas et al. | |
| 7,300,668 B2 | 11/2007 | Pryce Lewis et al. | |
| 7,332,537 B2 | 2/2008 | Bredt et al. | |
| 7,354,605 B2 | 4/2008 | Trogolo et al. | |
| 7,569,273 B2 | 8/2009 | Bredt et al. | |
| 7,790,061 B2 | 9/2010 | Gratson et al. | |
| 7,795,349 B2 | 9/2010 | Bredt et al. | |
| 7,815,826 B2 | 10/2010 | Serdy et al. | |
| 7,875,290 B2 | 1/2011 | Payumo et al. | |
| 7,905,951 B2 | 3/2011 | Williams | |
| 7,931,914 B2 | 4/2011 | Pryce Lewis et al. | |
| 8,013,042 B2 | 9/2011 | Ito | |
| 8,080,511 B2 | 12/2011 | Dreyer et al. | |
| 8,404,171 B2 | 3/2013 | Heenan | |
| 8,470,231 B1 | 6/2013 | Dikovsky et al. | |
| 8,685,296 B2 | 4/2014 | Liu et al. | |
| 8,715,436 B2 | 5/2014 | Bhatia et al. | |
| 8,822,590 B2 | 9/2014 | Hermes et al. | |
| 9,114,032 B1 | 8/2015 | Pulugurtha | |
| 9,347,037 B2 | 5/2016 | Masutani et al. | |
| 9,381,154 B2 | 7/2016 | Zhou et al. | |
| 9,381,564 B2 | 7/2016 | McGuire et al. | |
| 9,388,078 B2 | 7/2016 | Rael | |
| 9,458,357 B2 | 10/2016 | Bellan et al. | |
| 9,463,160 B2 | 10/2016 | Yoo et al. | |
| 9,630,365 B2 | 4/2017 | Frayne et al. | |
| 9,707,717 B2 | 7/2017 | Sand | |
| 9,744,722 B2 | 8/2017 | Rodgers | |
| 9,745,458 B2 | 8/2017 | Smith, Jr. et al. | |
| 9,856,390 B2 | 1/2018 | Bredt et al. | |
| 10,144,810 B2 | 12/2018 | Carrier et al. | |
| 2003/0114936 A1 | 6/2003 | Sherwood et al. | |
| 2004/0038009 A1 | 2/2004 | Leyden et al. | |
| 2004/0161544 A1 | 8/2004 | Kasperchik | |
| 2005/0017394 A1 | 1/2005 | Hochsmann et al. | |
| 2005/0059757 A1 | 3/2005 | Bredt et al. | |
| 2005/0281856 A1 | 12/2005 | McGlohorn et al. | |
| 2006/0018942 A1 | 1/2006 | Rowe et al. | |
| 2006/0230984 A1 | 10/2006 | Bredt et al. | |
| 2007/0182070 A1 | 8/2007 | Monsheimer et al. | |
| 2007/0241482 A1 | 10/2007 | Giller et al. | |
| 2010/0273667 A1 | 10/2010 | Kotov et al. | |
| 2011/0024939 A1 | 2/2011 | Alves | |
| 2012/0040581 A1 | 2/2012 | Kim | |
| 2015/0086606 A1 | 3/2015 | Cabrera et al. | |
| 2015/0165020 A1 | 6/2015 | Jaklenec et al. | |
| 2015/0273572 A1 | 10/2015 | Ederer et al. | |
| 2015/0290280 A1 | 10/2015 | Petrak et al. | |
| 2015/0374450 A1 | 12/2015 | Mansfield et al. | |
| 2015/0375419 A1 | 12/2015 | Günther et al. | |
| 2016/0038655 A1 | 2/2016 | Weisman et al. | |
| 2016/0046832 A1 | 2/2016 | Wroblesky et al. | |
| 2016/0066601 A1 | 3/2016 | Herr et al. | |
| 2016/0068678 A1 | 3/2016 | Luo et al. | |
| 2016/0102279 A1 | 4/2016 | Labeque et al. | |
| 2016/0193651 A1 | 7/2016 | Orange et al. | |
| 2016/0200044 A1 | 7/2016 | Voit et al. | |
| 2016/0281267 A1 | 9/2016 | Wetzel et al. | |
| 2016/0289415 A1 | 10/2016 | Okashimo et al. | |
| 2016/0297131 A1 | 10/2016 | Kameoka et al. | |
| 2016/0333165 A1 | 11/2016 | Bayer et al. | |
| 2017/0008072 A1 | 1/2017 | Cui et al. | |
| 2017/0015063 A1 | 1/2017 | Hanyu et al. | |
| 2017/0022341 A1 | 1/2017 | Bayer et al. | |
| 2017/0024501 A1 | 1/2017 | Greyf et al. | |
| 2017/0058142 A1 | 3/2017 | Vicari et al. | |
| 2017/0079262 A1 | 3/2017 | Rowley et al. | |
| 2017/0081500 A1 | 3/2017 | Bredt et al. | |
| 2017/0088656 A1 | 3/2017 | Sun | |
| 2017/0106595 A1 | 4/2017 | Günther et al. | |
| 2017/0120533 A1 | 5/2017 | Saito et al. | |
| 2017/0197365 A1 | 7/2017 | Sugiyama et al. | |
| 2017/0210037 A1 | 7/2017 | Ederer et al. | |
| 2017/0218228 A1 | 8/2017 | Jose et al. | |
| 2017/0259482 A1 | 9/2017 | Contractor | |
| 2017/0260359 A1 | 9/2017 | Hanyu et al. | |
| 2017/0274600 A1 | 9/2017 | Sugiyama et al. | |
| 2017/0283596 A1* | 10/2017 | Saito | B33Y 10/00 |
| 2017/0291327 A1 | 10/2017 | Rothfuss | |
| 2017/0312388 A1 | 11/2017 | Shoseyov et al. | |
| 2017/0348458 A1 | 12/2017 | Kesti et al. | |
| 2017/0348462 A1 | 12/2017 | Lao et al. | |
| 2018/0020691 A1 | 1/2018 | Aydin et al. | |
| 2018/0022023 A1 | 1/2018 | Therriault et al. | |
| 2018/0049464 A1 | 2/2018 | Zhang et al. | |

FOREIGN PATENT DOCUMENTS

| | | | | |
|---|---|---|---|---|
| EP | 1594677 B1 | 7/2007 | | |
| EP | 1638758 B1 | 8/2009 | | |
| GB | 2392446 A | * | 3/2004 | C08J 5/00 |
| WO | WO 2017/019393 A1 | 2/2017 | | |

OTHER PUBLICATIONS

Nippon Gohsei: "Brandnew Water Soluble Filament for 3D printer," Jan. 1, 2016, Retrieved from the Internet: [URL:http://www.nippongohsei.com/cache/downloads/7m5hyk0hclwkc08cg8k40occ4/MELFIL%20Brochure%202016%20English.pdf] Retrieved on Aug. 22, 2018 (2 pgs).

Mohan, "Water-soluble, biodegradable polymer introduced," Greener Package.com, [http://www.greenerpackage.com/resins/watersoluble_biodegradable_polymer_introduced], Jun. 8, 2009 (2 pgs).

"Nichigo G-Polymer® Biodegradable, High Barrier, Water Soluble, Extrusion Polymer," 2010 Place Conference, Apr. 18-21, 2010, Albuquerque, NewMexico (50 pgs).

"Soarus LLC's New Nichigo G-Polymer," Design News, Materials & Assembly, May 27, 2009 (6 pgs.).

Swager, "Biodegradable High Barrier for Packaging," bioplastics Magazine, vol. 4, 2009, Published Aug. 2, 2009, Accessed at [https://issuu.com/bioplastics/docs/bioplasticsmagazine_0904] (pp. 30-31, 1pg).

Chia et al., "Recent advances in 3D printing of biomaterials," Journal of Biological Engineering, 2015, 9:4 (14 pgs).

Curvelo et al., "Thermoplastic starch—cellulosic fibers composites: preliminary results," Carbohydrate Polymers, Jun. 2001, vol. 45, Issue 2 (pp. 183-188).

He et al., "Printing 3D microfluidic chips with a 3D sugar printer," Microfluidics and Nanofluidics, Aug. 2015, vol. 19, Issue 2, (pp. 447-456).

Ligon et al. "Polymers for 3D Printing and Customized Additive Manufacturing," Chem. Rev., 2017, 117 (15) (pp. 10212-10290).

Markstedt et al., "3D Bioprinting Human Chondrocytes with Nanocellulose—Alginate Bioink for Catilage Tissue Engineering Applications." Biomacromolecules, 2015, 16(5) (pp. 1489-1496)(Abstract only—2 pgs.).

Pfister et al., "Biofunctional rapid prototyping for tissue-engineering applications: 3D bioplotting versus 3D printing," Journal of Polymer Science: Part A: Polymer Chemistry, 2004, vol. 42, (pp. 624-638).

Press Releases, "Verbatim Unveils Two new 3D Printing Filaments," Accessed at 3printr.com [https://www.3printr.com/verbatim-unveils-three-new-3dprinting-filaments-1042725/]. Published Sep. 27, 2016 (4 pgs.).

Radhakrishnan et al., "Injectable and 3D Bioprinted Polysaccharide Hydrogels: From Cartilage to Osteochondral Tissue Engineering," Biomacromolecules, 2017, 18(1), pp. 1-26 (Abstract only—2pgs.).

\* cited by examiner

HIGH PERFORMANCE WATER SOLUBLE POLYMER COMPOSITIONS

CROSS-REFERENCE TO RELATED APPLICATION

This application claims priority to U.S. Provisional Application No. 62/994,446 filed Mar. 25, 2020, which is hereby incorporated by reference.

TECHNICAL FIELD

This disclosure relates to compositions and methods for producing and using water soluble polymer compositions.

BACKGROUND

Additive manufacturing processes, commonly referred to as three-dimensional (3D) printing, can be used to construct desired objects with possible applications in numerous industries (e.g., aerospace, automotive, medical, etc.). Exemplary processes include, but are not limited to, binder jet, electron beam melting (EBM), fused deposition modeling (FDM), fused filament fabrication (FFF), ink jetting, laminated object manufacturing (LOM), selective laser sintering (SLS), and stereolithography (SL). Using such processes, a desired object can be modeled in a computer-aided design (CAD) package and printed using a selected build material. For deposition based methods, like FDM, the selected build material is typically extruded through a heated printer in a layered manner according to computer instruction. Printing in commercially available additive manufacturing devices, like, for example, the ARBURG™ Freeformer system, often occurs in a build chamber that can provide heating and temperature control.

Many additive manufacturing techniques use support layers or structures to build a desired object. The limited availability of suitable support methods, materials, and structures, however, has restricted printing to certain design types. The most basic support method uses the same material for support as it does for the printed object, as, for example, shown in U.S. Pat. Nos. 6,228,923; 6,790,403; and 8,404,171. With this technique, a support is erected similarly to scaffolding on a building and "props up" any steeply angled overhangs or spans. Referred to as "breakable" or "raft" support, this type of support can be effective, but can also be messy, time-consuming, and difficult to remove by mechanical breakage or trimming. It is not unusual to spend hours cleaning or cutting away support material from a 3D-printed object using razor blades, scalpels, sandpaper, and even power tools. Methods using different support and printed materials can also be problematic. For example, certain hydrophobic polymers (e.g., polypropylene) are nearly impossible to print due to the incompatibility between the support materials and the 3D-printed base resin.

The inability to remove internal support materials can further restrict object design types. Some external geometries can make it difficult, if not impossible, to remove internal support material. For years, many have tried to solve this problem with support structures that are supposed to dissolve in very hot water, highly acidic or basic conditions, organic solvents, or various other chemicals. These products are often messy and even dangerous—and in general have been unsuccessful.

SUMMARY

A water soluble polymer composition, including a water soluble polymer (e.g., polyvinyl alcohol-co-vinylpyrrolidinone (PVOH-co-PVP)) and a sugar (e.g., trehalose), can solve several additive manufacturing problems: Such compositions can dissolve in room temperature water, at neutral pH, can be compatible with both hydrophilic and hydrophobic polymers, and can be used as a support material for build chamber temperatures above 100° C., which may, for example, be desirable when printing high temperature thermoplastics.

The advantages of a water soluble polymer composition are unexpected. Water soluble polymers are often brittle and thus not suited for use in conventional filament type additive manufacturing techniques. Some have tried to address this issue by using plasticizers, but this can dramatically reduce the temperature resistance of water soluble polymers, which can markedly limit the availability of water soluble polymers as a support material and thus the type of build materials that can be printed. Likewise, sugars, while often highly water soluble, tend to be brittle at room temperature and have low melt viscosity. Sugars typically cannot be extruded into useful filaments. Furthermore, most sugars are heat sensitive and caramelize or degrade above melting temperatures, making sustained extrusion impractical or impossible. A water soluble polymer composition, however, can be melt processable.

A water soluble polymer and a sugar can be substantially compatible. A water soluble polymer composition including a water soluble polymer and a sugar can exhibit improved stiffness at higher temperatures and improved rheological properties. The addition of a sugar to a water soluble polymer can also provide a tackifying effect, offering improved adhesion of the composition to a variety of substrates (e.g., a build plate). Without intending to be limited by theory, the sugar may be imparting pressure sensitive characteristics to facilitate improved adhesion at printing temperatures, as described by the Dahlquist Criterion.

A water soluble polymer composition including a water soluble polymer with PVOH-co-PVP copolymer and a sugar (e.g., trehalose, inositol) can, in addition to the advantages identified above, exhibit surprising strength and toughness properties, including when compared to a butenediol vinyl-alcohol copolymer (BVOH)/trehalose composition.

In some embodiments, a water soluble polymer composition can include a water soluble polymer with PVOH-co-PVP copolymer and a sugar having a melting point of at least a certain melting point (e.g., 186° C.). The water soluble polymer and the sugar can be substantially miscible and can be melt processable to form the water soluble polymer composition, which can also be substantially dry.

In some embodiments, a method includes processing a water soluble polymer including PVOH-co-PVP copolymer and a sugar having at least a certain melting point (e.g., 186° C.) to form a water soluble polymer composition. The water soluble polymer composition can form a feedstock. The feedstock can be printed to form a water soluble support.

In some embodiments, a water soluble support composition includes a water soluble polymer composition that is substantially stable at build chamber temperatures of at least 100° C. The water soluble polymer composition can include PVOH-co-PVP copolymer and a sugar having at least a certain melting point (e.g., 186° C.).

In some embodiments, a three-dimensional printed article can include a three-dimensional printed object generally disposed on a substantially horizontal build plate; and one or more soluble supports positioned about and supporting one or more portions of the three-dimensional printed object, the soluble supports comprising a water soluble polymer composition. The water soluble polymer composition supports can be formed from a water soluble polymer including PVOH-co-PVP copolymer and a sugar having at least a certain melting point (e.g., 186° C.).

The above summary is not intended to describe each disclosed embodiment or every implementation. The detailed description that follows more particularly exemplifies illustrative embodiments.

DETAILED DESCRIPTION

Unless the context indicates otherwise the following terms shall have the following meaning and shall be applicable to the singular and plural:

The terms "a," "an," "the," "at least one," and "one or more" are used interchangeably. Thus, for example, a water soluble polymer composition containing "a" water soluble polymer means that the water soluble polymer composition may include "one or more" water soluble polymers.

The terms "additive manufacturing", "three-dimensional printing", "3D printing," or "3D printed" refer to any process used to create a three-dimensional object in which successive layers of material are formed under computer control (e.g., electron beam melting (EBM), fused deposition modeling (FDM), ink jetting, laminated object manufacturing (LOM), selective laser sintering (SLS), and stereolithography (SL)).

The term "Bend Radius Test" refers to a test for assessing the failure bend radius of a filament, which relates to the toughness of the filament's composition. In the test, a filament is clamped into opposing jaws on a tensile testing machine with a centered filament loop held generally in place by a washer, the washer having, e.g., an inner diameter of ⅜ in. (0.9525 cm). The diameter/thickness of the filament is measured. The initial diameter of the filament loop is measured and taken to be the vertical diameter of the loop. The initial crosshead displacement on the tensile testing machine is also measured. The filament is then subjected to pulling, at a constant rate of 10 in/min, until a failure (filament rupture) occurs. The crosshead displacement at the filament failure is then measured. The failure bend radius can then be determined from the following equation: failure bend radius=((initial filament loop diameter*Pi)−(crosshead displacement at failure−initial crosshead position))/2*Pi.

The term "build chamber" refers to a volume, often enclosed, in or utilized by an additive manufacturing device within which a desired object can be printed. A non-limiting example of build chamber can be found in an ARBURG™ Freeformer (commercially available from Arburg GmbH, Lossburg, Germany).

The term "build chamber temperature" refers to the temperature provided in a build chamber during additive manufacturing.

The term "build material" refers to a material that is printed in three dimensions using an additive manufacturing process to produce a desired object, often remaining after removal of a soluble support.

The term "build plate" refers to a substrate, often a removable film or sheet, that a build material or soluble support can be printed on.

The term "composition" refers to a multicomponent material.

The term "copolymer" refers to a polymer derived, actually (e.g., by copolymerization) or conceptually, from more than one species of monomer. A copolymer obtained from two monomer species is sometimes called a biopolymer; a copolymer obtained from three monomers is sometimes called a terpolymer; a copolymer obtained from four monomers is sometimes called a quaterpolymer; etc. A copolymer can be characterized based on the arrangement of branches in the structure, including, e.g., as a linear copolymer and a branch copolymer. A copolymer can also be characterized based on how the monomer units are arranged, including, e.g., as an alternating copolymer, a periodic copolymer, a statistical copolymer, a graft copolymer, and a block copolymer.

The term "copolymerization" refers to polymerization in which a copolymer is formed.

The terms "disaccharide," "double sugar," or "biose" refer to a sugar compound formed, whether actually or conceptually, by a glycosidic bond between two monosaccharides or monosaccharide residues.

The term "Dissolution Test Method 1" refers to a method for testing the dissolution rate of a polymer or composition, the method including obtaining a 2.5 gram pellet sample of a material, placing the sample in about 50 mL of deionized water at about 85° C., and reporting the time it takes for the sample to completely dissolve, such that there are no observable pellets.

The terms "draw", "draw down", "drawn", "drawing", or "stretching" refer to the process of elongating a melt processed feedstock at temperatures near (within about 50° C.) the glass transition temperature of a polymeric composition.

The term "draw ratio" refers to the ratio of material thickness (e.g., filament diameter) before drawing to the material thickness after drawing.

The term "feedstock" refers to the form of a material that can be utilized in an additive manufacturing process (e.g., as a build material or soluble support). Non-limiting feedstock examples include, but are not limited to, pellets, powders, filaments, billets, liquids, sheets, shaped profiles, etc.

The term "high temperature thermoplastic" refers to a polymer or polymeric composition that is typically melt processed at or above about 220° C. Non-limiting examples of high temperature thermoplastics include, but are not limited to, polycarbonate (PC), polyamides (Nylon), polyesters (PET), polyether ether ketone (PEEK) and polyetherimide (PEI).

The term "melt processing technique" means a technique for applying thermal and mechanical energy to reshape, blend, mix, or otherwise reform a polymer or composition, such as compounding, extrusion, injection molding, blow molding, rotomolding, or batch mixing.

The term "mixing" means to combine or put together to form one single substance, mass, phase, or more homogenous state. This may include, but is not limited to, all physical blending methods, extrusion techniques, or solution methods.

The term "monomer" refers to a molecule that can undergo polymerization to contribute structural units to the essential structure of a polymer.

The term "monosaccharide" refers to a molecule that is a simple sugar and cannot be hydrolyzed to form a simpler sugar. The term includes aldoses, ketoses, and various derivatives, such as sugar alcohols. Such derivatives can, e.g., be formed, whether actually or conceptually, by oxidation, deoxygenation, introduction of other substituents, alkylation and acylation of hydroxy groups, and chain branching. Non-limiting examples of a monosaccharide include triose, tetrose, glyceraldehyde, and dihydroxyacetone.

The term "oligosaccharide" means a small number (e.g., 2 to 6 or 2 to 4) monosaccharide residues covalently linked.

The terms "polymer" and "polymeric" refer a molecule of high relative molecular mass, the structure of which essentially contains multiple repetitions of units derived, actually or conceptually, from molecules of low relative molecular mass. The term "polymer" can refer to a "copolymer."

The term "polymerization" refers to the process of converting monomers into a polymer.

The term "polysaccharide" refers to compounds consisting of many monosaccharide units, disaccharide units, oligosaccharide units, or residues thereof linked glycosidically (e.g., starch).

The terms "preferred" and "preferably" refer to embodiments that may afford certain benefits, under certain circumstances. Other embodiments, however, may also be preferred, under the same or other circumstances. Furthermore, the recitation of one or more preferred embodiments does not imply that other embodiments are not useful and is not intended to exclude other embodiments from the claimed scope.

The term "semi-crystalline" refers to a polymeric composition with crystallinity greater than 5% but less than 90% as measured by differential scanning calorimetry (DSC) in accordance with ASTM standard D3418-12—Standard Test Method for Transition Temperatures and Enthalpies of Fusion and Crystallization of Polymers by Differential Scanning Calorimetry.

The term "soluble support" or "soluble support material" refers to a material that is printed in three dimensions using an additive manufacturing process to physically support or brace the build material during printing and that can be removed by chemical solvation or dissolution as desired during or after the additive manufacturing process.

The term "substantially dry" means that the substance contains by weight about 15% or less volatiles, and preferably about 10% or less volatiles, at standard conditions based on the weight of the water soluble polymer composition.

The terms "substantially miscible" or "substantial miscibility" refer to the compatibility of materials in a composition (e.g., a water soluble polymer composition), such that the composition exhibits behavior expected of a single phase system, often shown by the composition having a single glass transition and/or melting temperature (e.g., when tested using differential scanning calorimetry).

The terms "substantially stable" or "substantial stability" refer to a material that largely exhibits dimensional stability (e.g., with minimal flow, melting, or deformation) at print processing temperatures (e.g., a build chamber temperature).

The term "sugar" refers to a compound including carbon, hydrogen, and oxygen, such as an aldose or a ketose that can have, but is not limited to, a stoichiometric formula of $C_n(H_2O)_n$. The term can refer to any monosaccharide, disaccharide, oligosaccharide, or polysaccharide as well as a compound derived, whether actually or conceptually, from them by reduction of the carbonyl group (alditols), by oxidation of one or more terminal groups to a carboxylic acid, or by replacement of one or more hydroxy group(s) by a hydrogen atom, an amino group, thiol group, or similar groups. The term can also refer to a derivative, whether actual or conceptual, from such a compound.

The term "water soluble" refers to a material that absorbs, swells, dissolves, disintegrates, or deteriorates in the presence of water.

The term "water soluble polymer composition" refers to a composition that includes a water soluble polymer and a sugar.

The recitation of numerical ranges using endpoints includes all numbers subsumed within that range (e.g. 1 to 5 includes 1, 1.5, 3, 3.95, 4.2, 5, etc.).

Figure 1:
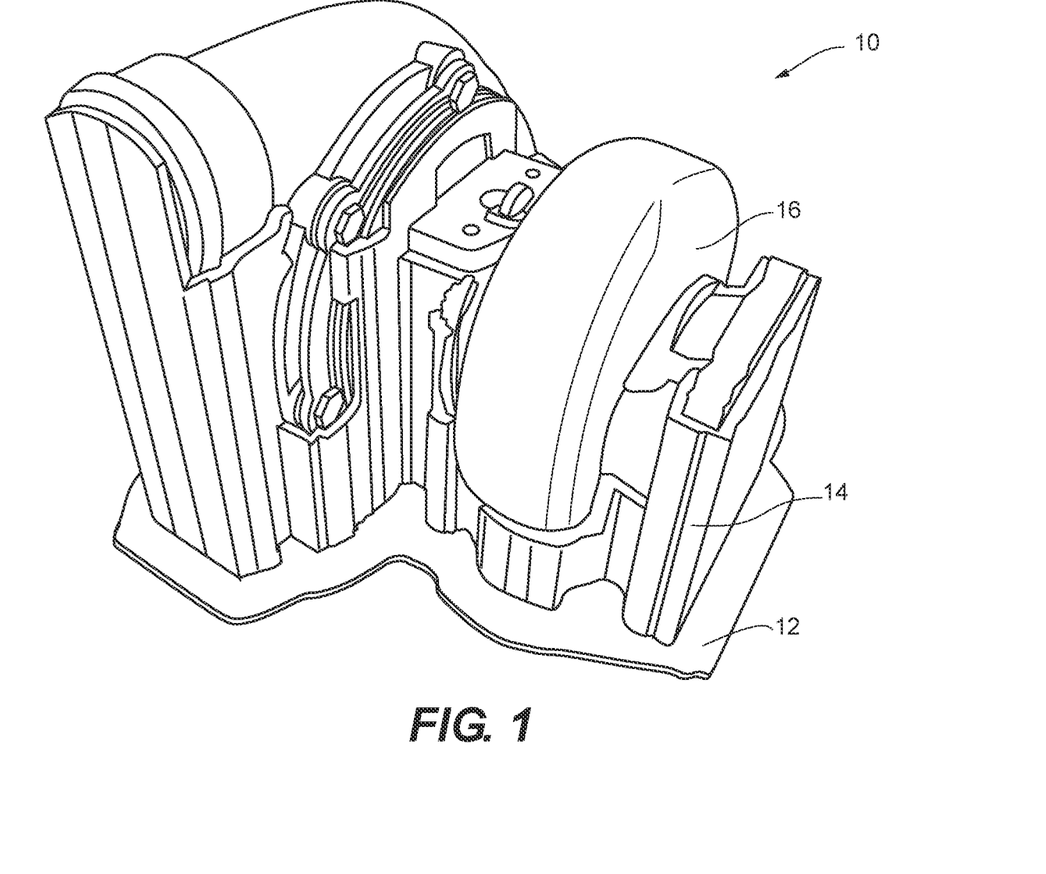
FIG. 1 illustrates a Nylon 6-6 3D printed object with soluble supports made from a water soluble polymer composition including polyvinyl alcohol-co-vinylpyrrolidinone (PVOH-co-PVP) and trehalose.

As illustrated in FIG. 1, a water soluble polymer composition can be used as a soluble support material for a variety of build materials, including, e.g., high temperature materials like Nylon 6-6, in additive manufacturing. FIG. 1 depicts 3D printed object with soluble support 10, which includes raft 12, soluble support made from a water soluble polymer composition including polyvinyl alcohol-co-vinylpyrrolidinone (PVOH-co-PVP) and trehalose 14, and Nylon 6-6 3D printed object 16. Raft 12 can provide contact with a build plate and can be made from a variety of materials, including, e.g., a water soluble polymer composition. Soluble support 14 can be a water soluble polymer composition (e.g., 70 wt. % PVOH-co-PVP/30 wt % trehalose or inositol) printed in three dimensions using an additive manufacturing process to provide physical support or brace a build material of a desired object during printing (e.g., Nylon 6-6 3D printed object 16). Soluble support 14 can be removed by chemical solvation or dissolution during or after the additive manufacturing process. Printed object 16 is an object of desired shape and material that can be produced using additive manufacturing and has a variety of possible end or intermediate uses. A printed object, like printed object 16, may, in some embodiments, include or be made entirely from a water soluble polymer composition.

Figure 2:
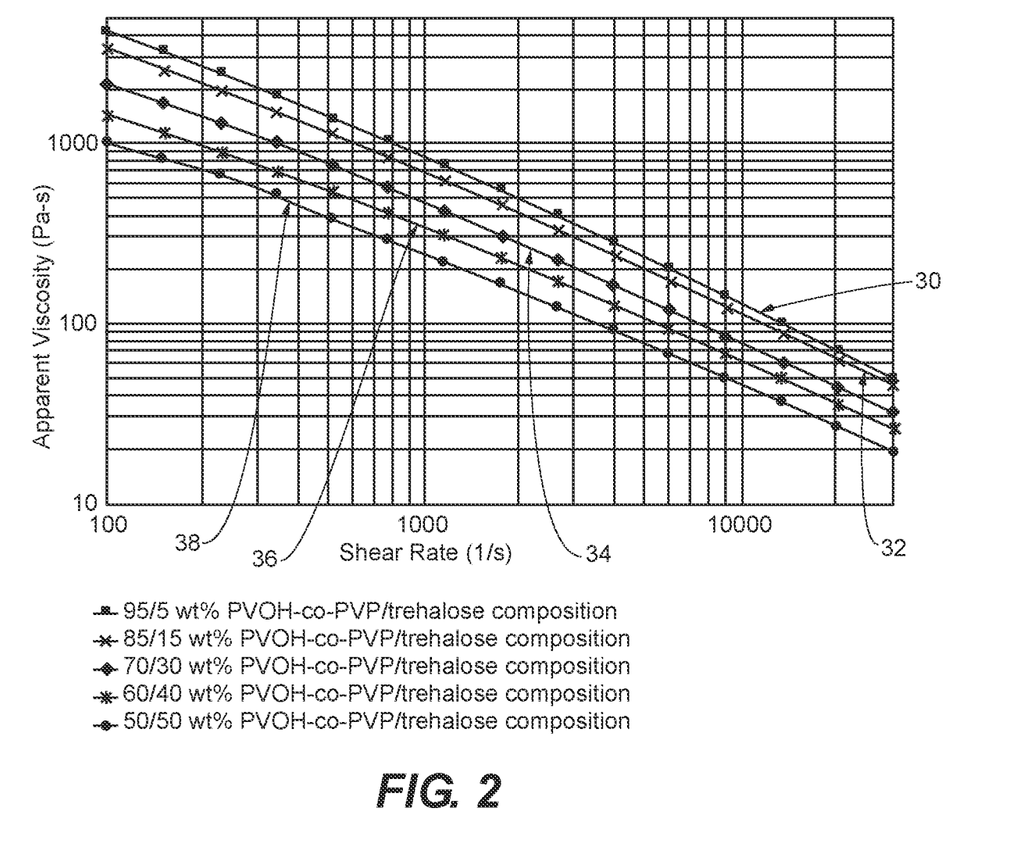
FIG. 2 is a rheology curve plot for PVOH-co-PVP/trehalose water soluble polymer compositions.

As illustrated in FIG. 2, a water soluble polymer composition can exhibit different rheological properties based on the level of sugar present in the composition. FIG. 2 is a rheology curve plot comparing the apparent viscosity (Pa·s) as a function of shear rate (1/s) at a temperature of 2200° C. The plot displays one curve per run. The apparent shear rates range between 30000/s to 100/s. The die had a diameter of 0.507 mm, a length of 10.000 mm, and a cone angle of 120 degrees. The plot includes curve 30 for a 95/5 wt % PVOH-co-PVP/trehalose composition, curve 32 for a 85/15 wt % PVOH-co-PVP/trehalose composition, curve 34 for a 70/30 wt % PVOH-co-PVP/trehalose composition, curve 36 for a 60/40 wt % PVOH-co-PVP/trehalose composition, and curve 38 for a 50/50 wt % PVOH-co-PVP/trehalose composition.

Figure 3:
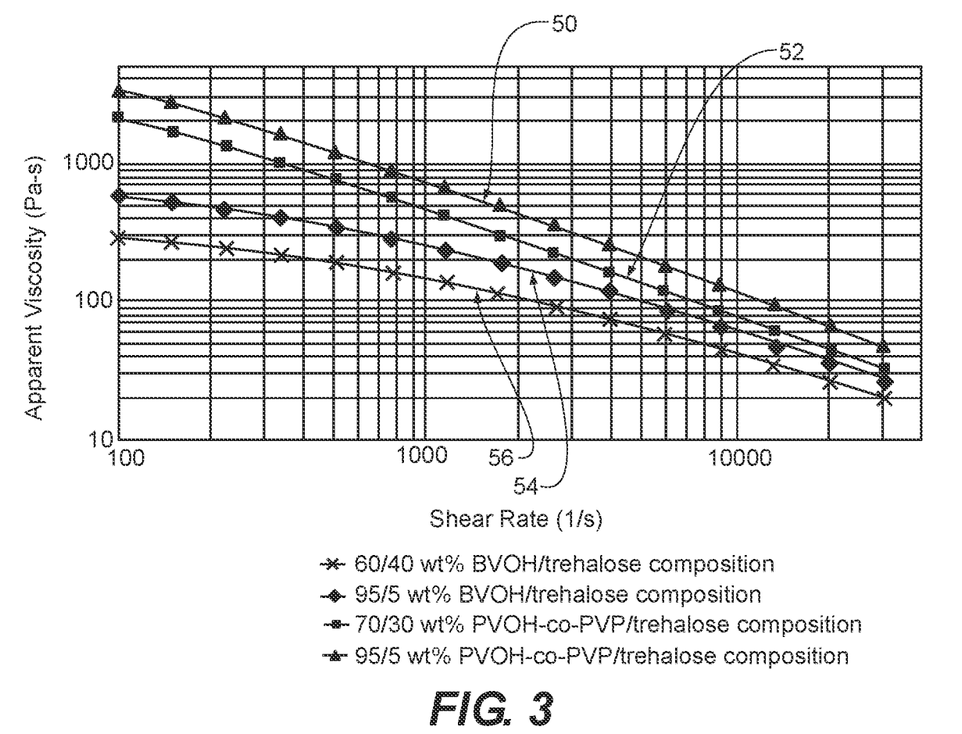
FIG. 3 is a rheology curve plot comparing PVOH-co-PVP/trehalose and butenediol vinylalcohol copolymer (BVOH)/trehalose compositions.

As illustrated in FIG. 3, PVOH-co-PVP/trehalose compositions can exhibit improved rheological properties over butenediol vinylalcohol copolymer (BVOH)/trehalose compositions. FIG. 3 is a rheology curve plot comparing the apparent viscosity (Pa·s) as a function of shear rate (1/s) at a temperature of 2200° C. The plot displays one curve per run. The apparent shear rates range between 30000/s to 100/s. The die had a diameter of 0.507 mm, a length of 10.000 mm, and a cone angle of 120 degrees. The plot includes curve 50 for a 95/5 wt % PVOH-co-PVP/trehalose composition, curve 52 for a 70/30 wt % PVOH-co-PVP/trehalose composition, curve 54 for a 95/5 wt % BVOH/trehalose composition, and curve 56 for a 60/40 wt % BVOH/trehalose composition.

Figure 4A:
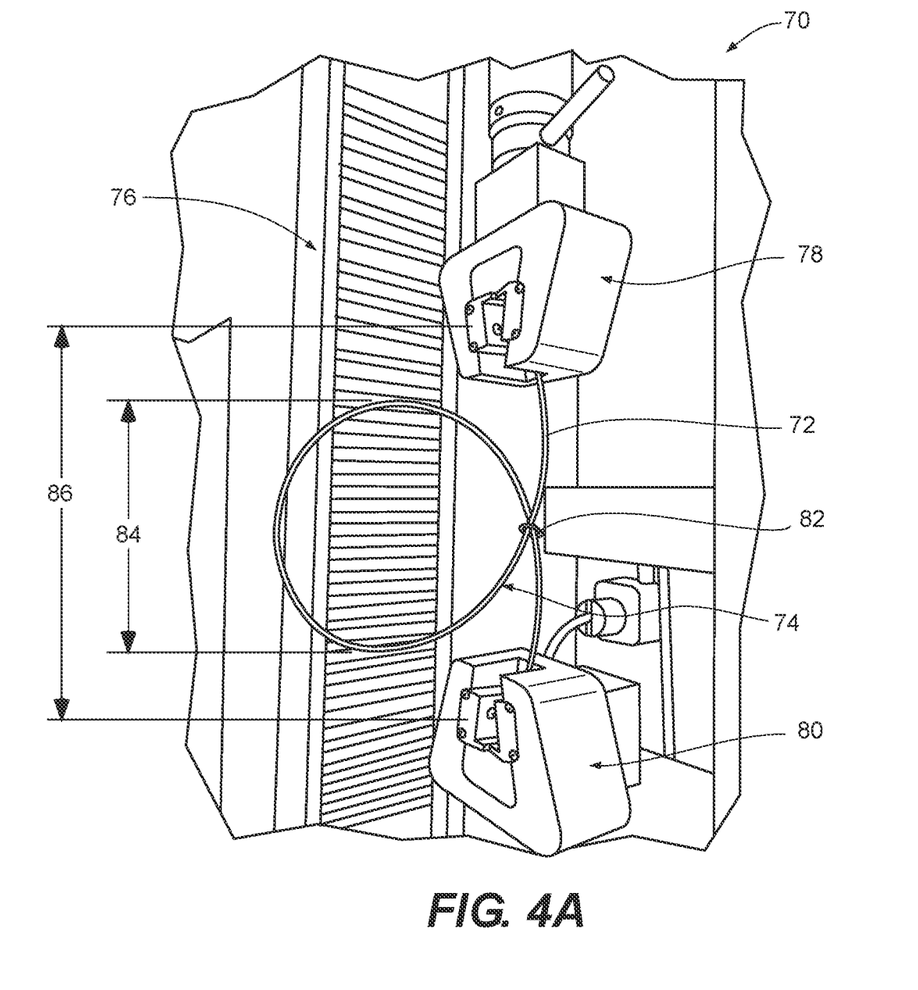
FIG. 4A is an image of an initial Bend Radius Test setup in a tensile testing machine for a water soluble polymer composition filament.
Figure 4B:
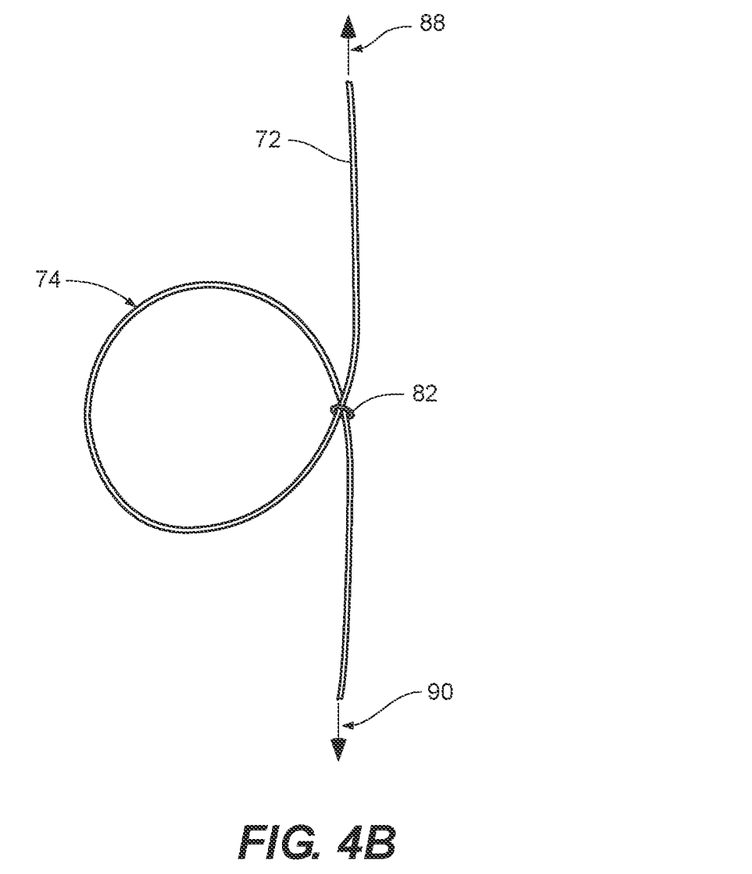
FIG. 4B is an illustration of the water soluble polymer composition filament of FIG. 4A as it is pulled in the tensile testing machine during a Bend Radius Test.

As illustrated in FIGS. 4A and 4B, a filament including a water soluble polymer composition can be subjected to the Bend Radius Test. The Bend Radius Test measures the failure bend radius of a filament, which can be used to assess the toughness of the filament composition. FIG. 4A is an image of initial Bend Radius Test setup 70 for filament 72. FIG. 4B is an illustration of filament 72 being pulled during a Bend Radius Test. FIGS. 4A and 4B include initial Bend Radius Test setup 70, water soluble polymer composition filament 72, filament loop 74, tensile testing machine 76, upper tensile clamp 78, lower tensile clamp 80, washer 82, initial filament loop diameter 84, initial crosshead displacement 86, upper pull direction 88, and lower pull direction 90. In a Bend Radius Test, a filament (e.g., filament 72) can be set up in a tensile testing machine (e.g., a MTS Criterion Series 40 Electromechanical Universal Test System, Model C43.503, manufactured by MTS System Corporation, Eden Prairie, MN) like tensile testing machine 76, such that the failure bend radius of the filament loop, e.g., filament loop 74, can be determined. The diameter/thickness of the filament, e.g., filament 72, is measured, as the failure bend radius can generally increase with an increased filament diameter/thickness. The filament is threaded through a washer, e.g., washer 82, such that the filament bad a filament loop, e.g., filament loop 74. The inner diameter of the washer, e.g., washer 82, must be sufficiently large to accommodate two adjacent lengths of filament, constricting the free movement during testing as little as possible, while also limiting additional lateral movement that can contribute to cosine error. The ends of the filament are clamped in the clamps of the tensile testing machine, e.g., in upper tensile clamp 78 and lower tensile clamp 80. The initial diameter of the filament loop, e.g., initial filament loop diameter 84, and the initial cross head displacement on the tensile testing machine, e.g., initial cross head displacement 86, are measured.

As shown in FIG. 4B, the filament is then pulled, e.g., in upper puller direction 88 and lower puller direction 90, diminishing the radius of the filament loop, e.g., filament loop 74. Upon break or failure of the filament, the crosshead displacement at the failure is measured. The failure bend radius of the filament is then determined according to the following equation: failure bend radius=((initial filament loop diameter*Pi)−(crosshead displacement at failure−initial crosshead position))/2*Pi. Failure bend radius is indicative of the toughness of a filament composition. A bend radius of less than 2 inches is desirable for filament used in additive manufacturing applications.

A variety of water soluble polymers may be employed in a water soluble polymer composition. Non-limiting examples of water soluble polymers include coagulants, such as quaternary polyamines, polydiallyl ammonium chloride (polyDADMAC), and dicyandiamide resins; flocculants, such as nonionic, anionic, and cationic materials; amphoteric polymers; polyethyleneimines; poly amide-amines; poly amine-based polymers; polyethylene oxides; sulphonated compounds; polyvinylpyrrolidone; polylactic acid; polylactones; polyacrylate-type 5 dispersants; poly alcohols; cellulose derivatives; or combinations thereof. Such water soluble polymers may also be used in or to form a water soluble copolymer. Non-limiting examples of water soluble copolymers include copolymers of polyvinyl alcohols (PVOH), including polyvinyl alcohol-co-vinylpyrrolidinone (PVOH-co-PVP), polyvinyl alcohol-co-vinylamine, polyvinyl alcohol-co-vinyl acetate, polyvinyl alcohol-co-butenediol vinyl alcohol, polyvinyl alcohol-co-vinyl acetate, polyvinyl alcohol-co-polyacrylate, polyvinyl alcohol-co-polymethacrylate. Non-liming examples of commercially available water soluble copolymers include PVOH-co-PVP sold as ULTILOC 4005™ by Seikisui Corporation and BVOH, sold as NICHIGO GPOLYMER™ by Nippon Goshei, poly-2-ethyloxazoline, sold as AQUAZOL™ by Polymer Chemistry Innovations, Inc., and hydroxypropyl methylcellulose, sold as AFFINISOL™ by Dow Chemical Co.

A variety of sugars may be employed in a water soluble polymer composition. Such sugars can enhance solubility and adhesion to hydrophobic polymers. Non-limiting examples of sugars include monosaccharides, disaccharides, oligosaccharides, polysaccharides, sugar alcohols, or derivatives thereof. A non-limiting commercially available example of a sugar is trehalose, sold as TREHA™ sugar by Nagase Corporation (Tokoyo, Japan). Other exemplary sugars include, but are not limited to, sucrose, lactulose, lactose, maltose, cellobiose, chitobiose octaacetate, kojibiose, nigerose octaacetate, isomaltose, isomaltulose, beta,beta-trehalose, alpha,beta-trehalose, sophorose, laminaribiose, gentiobiose, turanose, maltulose, palatinose, gentiobiulose, mannobiose, melibiose, melibiulose, ructinose, ructinulose, melezitose, xylobiose, xylitol, ribitol, mannitol, sorbitol, galactitol, fucitol, iditol, inositol, perseitol, volemitol, isomalt, maltitol, lactitol, maltotriitol, or maltotetraitol.

It may be desirable to employ a sugar in a water soluble polymer composition that has at least a certain melting point. For example, it may be desirable to employ a sugar having at melting point of at least 85° C., of at least 100° C., of at least 125° C., of at least 140° C., of at least 150° C., of at least 160° C., of at least 175° C., of at least 180° C., of at least 185° C., of at least 186° C., of at least 190° C., of at least 195° C., of at least 196° C., of at least 200° C., of at least 203° C., of at least 210° C., of at least 215° C., of at least 250° C., of at least 253° C., of at least 300° C., or of at least 304° C. Exemplary sugars and their respective melting points are shown in Table 1.

TABLE 1

SUGAR MELTING POINTS

| Material | Melting Point (° C.) | Material | Melting Point (° C.) |
|---|---|---|---|
| chitobiose octaacetate | 304-405 | Kojibiose | 175 |
| Laminaribiose | 253 | Lactulose | 169 |
| Inositol | 226 | Maltose (anhydrous) | 160-165 |
| Cellobiose | 225 | Meletiose | 152 |
| Trehalose | 203 | Turanose | 142 |
| Lactose | 203 | Palatinose | 125-128 |
| Sophorose | 196-198 | Maltulose | 125 |
| Xylobiose | 195 | Isomaltulose | 123 |
| Gentiobiose | 190-195 | Xylitol | 92 |
| Sucrose | 186 | Melibose | 85 |

A variety of other polymers, which may be miscible or non-miscible with a water soluble polymer or sugar, may be employed in a water soluble polymer composition. Such polymers can include virgin or recycled thermoplastics, elastomers, and thermosets. Non-limiting examples of such polymers include high density polyethylene (HDPE), low density polyethylene (LDPE), linear low density polyethylene (LLDPE), polypropylene (PP), polyolefin copolymers (e.g., ethylene-butene, ethylene-octene, ethylene-vinyl acetate, ethylene-vinyl alcohol), polystyrene, polystyrene copolymers (e.g., high impact polystyrene, acrylonitrile-styrene, acrylonitrile-butadiene-styrene), polyacrylates, polymethacrylates, polyesters, polyvinylchloride (PVC), fluoropolymers, liquid crystal polymers, polyamides, polyimides, polyether imides, polyphenylene sulfides, polysulfones, polyacetals, polycarbonates, cycloolefin copolymers, silicones, polyphenylene oxides, polyurethanes, thermoplastic elastomers (e.g., SIS, SEBS, SBS), thermoplastic vulcanates, epoxies, alkyds, melamines, phenolics, ureas, vinyl esters, cynate esters, silicones, or combinations thereof.

A variety of other additives, which may be miscible or non-miscible with a water soluble polymer or sugar, may be employed in a water soluble polymer composition. Non-limiting examples of suitable additives include antioxidants, light stabilizers, fibers, blowing agents, foaming additives, antiblocking agents, heat reflective materials, heat stabilizers, impact modifiers, biocides, antimicrobial additives, compatibilizers, plasticizers, tackifiers, processing aids, lubricants, coupling agents, thermal conductors, electrical conductors, catalysts, flame retardants, oxygen scavengers, fluorescent tags, inert fillers, minerals, and colorants. Additives may be incorporated into a water soluble polymer composition as a powder, liquid, pellet, granule, or in any other extrudable form. The amount and type of conventional additives in the water soluble polymer composition may vary depending upon the polymeric matrix and the desired properties of the finished composition. In view of this disclosure, a person having ordinary skill in the art will recognize that an additive and its amount can be selected in order to achieve desired properties in the finished material. Typical additive loading levels may be, for example, approximately 0.01 to 5 wt % of the composition formulation.

A variety of different loadings of water soluble polymer and sugar can be employed in a water soluble polymer composition. A water soluble polymer composition may, for example, include at least about 10 wt % water soluble polymer, or at least about 20 wt % water soluble polymer, or at least about 40 wt % water soluble polymer, and up to about 50 wt % water soluble polymer, or up to about 85 wt % water soluble polymer, or up to about 90 wt % water soluble polymer. A water soluble polymer composition may, e.g., include at least about 0.1 wt % sugar, or at least about 1 wt % sugar, or at least about 2 wt % sugar, or at least about 5 wt % sugar, or at least about 20% sugar, and up to about 50 wt % sugar, or up to about 75 wt % sugar, or up to about 90 wt % sugar, or about to about 95 wt % sugar, or up to about 99.9 wt % sugar. In view of this disclosure, a person of ordinary skill in the art will recognize that other polymers and additives can be included In preferred embodiments, a water soluble polymer composition can include PVOH-co-PVP copolymers and trehalose. PVOH-co-PVP tends to be both water soluble and stable above its melting point. In addition, trehalose tends to be a thermodynamically and kinetically stable, non-reducing, and natural disaccharide. The combination can provide numerous benefits. As illustrated in FIG. 2, PVOH-co-PVP and trehalose can exhibit desirable thermal rheological properties. Also, trehalose can enhance water solubility of the composition, can enhance adhesion to hydrophobic polymers (e.g., polyolefins), can increase stiffness at higher temperatures, can improve adhesion to common/typical build plate materials, and can increase brittleness with higher loading levels, which may allow easier breakaway of or from the 3D printed part.

In such preferred embodiments, a water soluble polymer composition may, for example, include at least about 10 wt % PVOH-co-PVP, at least about 20 wt % PVOH-co-PVP, or at least about 40 wt % PVOH-co-PVP, and up to about 50 wt % PVOH-co-PVP, or up to about 85 wt % PVOH-co-PVP, or up to about 90 wt % PVOH-co-PVP. In such preferred embodiments, a water soluble polymer composition may include at least about 0.1 wt % trehalose, or at least about 1 wt % trehalose, or at least about 2 wt % trehalose, or at least about 5 wt % trehalose, or at least about 20% trehalose, and up to about 50 wt % trehalose, or up to about 75 wt % trehalose, or up to about 90 wt % trehalose, or about to about 95 wt % trehalose, or up to about 99.9 wt % trehalose. In a preferred embodiment, a water soluble polymer composition may include about 70 wt % PVOH-co-PVP and about 30 wt % trehalose. In other embodiments, a water soluble polymer may include 95 wt % PVOH-co-PVP and about 5 wt % trehalose; or 60 wt % PVOH-co-PVP and about 40 wt % trehalose.

In other embodiments, a water soluble polymer composition may include at least about 0.1 wt % inositol, or at least about 1 wt % inositol, or at least about 2 wt % inositol, or at least about 5 wt % inositol, or at least about 20% inositol, and up to about 50 wt % inositol, or up to about 75 wt % inositol, or up to about 90 wt % inositol, or about to about 95 wt % inositol, or up to about 99.9 wt % inositol.

A water soluble polymer composition can, e.g., be prepared by mixing, melt processing, or a combination thereof. Depending on the selected polymeric matrix, this can be done using a variety of mixing processes known to those skilled in the art. The water soluble polymer, sugar, and optional polymers and additives can be combined together by any of the blending means usually employed in the plastics industry, such as with a compounding mill, a Banbury mixer, or a mixing extruder. In another preferred embodiment, a vented twin screw extruder is utilized. The materials may be used in the form, for example, of a powder, a pellet, or a granular product. The mixing operation is most conveniently carried out at a temperature above the melting point or softening point of the water soluble polymer, sugar, or both the water soluble polymer and sugar. The resulting melt processed water soluble polymer composition can be extruded directly into the form of the final product shape, or can be pelletized or fed from the melt processing equipment into a secondary operation to pelletize the composition (e.g., using a pellet mill or densifier) for later use. In another embodiment, the water soluble polymer composition and optional additives can be 3D printed.

A water soluble polymer composition can provide several advantages. For example, the dissolution rate, e.g., as measured in accordance with Dissolution Test Method 1, of water soluble polymer composition can be significantly higher than that of the water soluble polymer component alone. In some embodiments, the dissolution rate of a water soluble polymer composition can be more than 20% than higher than the water soluble polymer component alone. In other embodiments, the dissolution rate of a water soluble polymer composition can be more than 50% than higher than the water soluble polymer component alone. In other embodiments, the dissolution rate of a water soluble polymer composition can be more than 75% than higher than the water soluble polymer component alone. In one embodiment, the dissolution rate of the water soluble composition is at least 25 mg/min, in a preferred embodiment the dissolution rate is at least 60 mg/min, in a most preferred embodiment the dissolution rate is at least 80 mg/min. Water soluble polymer compositions can also be substantially stable at build chamber temperatures of at least about 100° C., or at least about 120° C., or at least about 140° C., or at least about 150° C., or at least about 170° C., or at least about 190° C., or at least about 210° C. and up to about 300° C.

A water soluble polymer composition can exhibit improved strength and toughness properties. In some embodiments, as tested in accordance with ASTM standard D256-10, a water soluble polymer composition can exhibit notched IZOD impact values of at least about 0.37 ft-lbs/in (about 19.75 J/m) or at least about 0.45 ft-lbs/in (about 24.02 J/m). In some embodiments, as tested in accordance with ASTM D4812-11, a water soluble polymer composition can exhibit unnotched IZOD impact values of at least about 1.27 ft-lbs/in (about 67.79 J/m) or at least about 2.06 ft-lbs/in (about 109.96 J/m). In some embodiments, as tested in accordance with the Bend Radius Test, a water soluble polymer composition can exhibit a failure bend radius of about 2.4 inches (6.096 cm) or less, or of about 1.0 inch (2.54 cm) or less, or of about 0.8 (2.032 cm) inches or less.

In preferred embodiments, as tested in accordance with ASTM standard D256-10, a water soluble polymer composition including PVOH-co-PVP and trehalose can exhibit notched IZOD impact values of least about 0.45 ft-lbs/in (about 24.02 J/m). In preferred embodiments, as tested in accordance with ASTM D4812-11, a water soluble polymer composition including PVOH-co-PVP and trehalose can exhibit unnotched IZOD impact values of at least about 2.06 ft-lbs/in (about 109.96 J/m). In preferred embodiments, as tested in accordance with the Bend Radius Test, a water soluble polymer composition can exhibit a failure bend radius of about 1.0 inch (2.54 cm) or less, or of about 0.8 (2.032 cm) inches or less.

A water soluble polymer composition can be used as a feedstock in fused deposition modeling (FDM). In some preferred embodiments, the feedstock may be a filament but other feedstocks (e.g., film, sheet, shaped profile, powder, pellet, etc.) can also be used. While some water soluble polymer compositions with higher sugar loading may be well-suited for use as a water soluble support in some additive manufacturing processes, such compositions may be too brittle for use in some FDM processes. In particular, feedstock having such compositions may break when pulled through the filament path and pushed into a heated nozzle. It may be necessary to draw down or stretch the composition while it is cooled to enhance the toughness. By drawing down or stretching the composition, the water soluble polymer chains as well as the sugar become aligned in the direction of pull, which ultimately toughens the composition making it possible to turn the composition into a feedstock that does not break, or is much less likely to break, during the FDM 3D printing process.

Without intending to be limited by theory, drawing can increase the crystallinity of the extruded feedstock through a stress alignment phenomenon. It is well known in additive manufacturing that it can be challenging to print semi-crystalline and crystalline polymers because they have a tendency to shrink in the build chamber when allowed to relax. This can result in part warpage and curling. A water soluble polymer composition can provide printed parts with low warpage even when the water soluble polymer composition is semi-crystalline. This may be because a water soluble composition can provide excellent adhesion to various build materials and build plates. In some embodiments, a water soluble polymer composition can show remarkable adhesion properties to a wide range of build plates and build materials including: polyethylene, polypropylene, ultra high molecular weight polyethylene (UMHWD), polytetrafluoroethylene. polyamide (e.g., Nylon 6, Nylon 6.6, Nylon 12), polyimide (e.g., Kapton), polyether-imide (PEI), polyetheretherkeetone (PEEK), polyacrylonitrile-butadiene-stryrene (ABS), polylactic acid (PLA), polyacrylic (e.g., PMMA), polycarbonate (PC) and others.

Alignment provided by drawing can increase the crystallinity of the extruded feedstock and dramatically improve certain mechanical properties (e.g., tensile strength and ductility) that enable it to function in a printer. The drawing can be achieved by several methods. In some embodiments, the feedstock can be conventionally extruded and then processed using a godet operation that can heat and draw the filament at the proper temperatures. This operation can be performed inline or offline. In other embodiments, a water soluble polymer composition can be extruded and cooled, and reheated between two or more pullers that are operating at different pull speeds to draw the filament. It is also possible to precisely cool the extruded composition and draw inline using an appropriate downstream extrusion design. In view of this disclosure, person of ordinary skill in the art will appreciate other ways of achieving desired draw ratios and chain alignment to produce a feedstock, such as a filament, of a water soluble polymer composition.

In preferred embodiments, however, a water soluble polymer composition can be used as a feedstock without needing to draw down the composition. In some preferred embodiments, a water soluble polymer composition, e.g., including PVOH-co-PVP and trehalose or inositol can be used as a feedstock without needing to draw down the composition. Without intending to be limited by theory, such a water soluble polymer composition can exhibit improved strength and toughness and be used as a feedstock without needing to do induce such properties by altering crystallinity. In other words, a feedstock of such a water soluble polymer composition can have sufficient mechanical properties without drawing so as not to break, e.g., during the FDM 3D printing process.

A water soluble polymer composition can also be converted into an article using conventional melt processing techniques, such as compounding, extrusion, molding, and casting, or additive manufacturing processes. For use in additive manufacturing processes, a variety of additive manufacturing devices can employ water soluble polymer compositions, as, for example, a support or build material. Non-limiting examples of such additive manufacturing devices include, but are not limited to, the Dremel DigiLab 3D45 3D Printer, LulzBot Mini 3D Printer, MakerBot Replicator+, XYZprinting da Vinci Mini, Ultimaker 3, Flashforge Finder 3D Printer, Robo 3D RT+Plus, Ultimaker 2+, Ultimaker 5s, and AON M2. A water soluble polymer composition can be selectively removed as either a build or support material (e.g., by dissolution or mechanically) manually, automatically (e.g., computer controlled dissolution), or by some combination thereof. A variety of polymers and additives, such as those already disclosed above, can be added to the disclosed water soluble polymer composition to form an article.

Compositions and articles incorporating a water soluble polymer composition have broad utility in many industries, including, but not limited to, additive manufacturing. These compositions and articles can provide significant value to plastics compounders and converters, offering, e.g., enhanced solubility and adhesion to hydrophobic and hydrophilic polymers, tunable rheological properties, and increased modulus at higher temperatures.

In the following Examples, all parts and percentages are by weight unless otherwise indicated.

EXAMPLES

TABLE 2

MATERIALS

| Material | Supplier |
|---|---|
| Water Soluble Polymer 1 (WSP 1) | ULTILOC ™, 4005, water soluble polymer, Polyvinyl alcohol-co-polyvinylpyrrolidinone (PVOH-co-PVP), commercially available from Sekisui Chemical Co. (Dallas, TX) |
| Water Soluble Polymer 2 (WSP 2) | NICHIGO G-POLYMER ™, 8049, BVOH, commercially available from Mitsubishi Chemical |
| Nylon 6.6 | Nylon 6.6 filament, commercially available from Dynanism, Inc. |
| Sugar 1 | TREHA ™, sugar, trehalose, available from Nagase Corporation (Tokoyo, Japan). |
| Sugar 2 | Inositol, commercially available from Nagase Corporation (Tokyo, Japan) |

TABLE 3

EXPERIMENTAL FORMULATIONS

| Formulation | WSP 1 | WSP 2 | Sugar 1 | Sugar 2 |
|---|---|---|---|---|
| CE1 |  | 95 | 5 |  |
| CE2 |  | 70 | 30 |  |
| 1 | 95 |  | 5 |  |
| 2 | 90 |  | 10 |  |
| 3 | 85 |  | 15 |  |
| 4 | 80 |  | 20 |  |
| 5 | 75 |  | 25 |  |
| 6 | 70 |  | 30 |  |
| 7 | 65 |  | 35 |  |
| 8 | 60 |  | 40 |  |
| 9 | 55 |  | 45 |  |
| 10 | 50 |  | 50 |  |
| 11 | 95 |  |  | 5 |
| 12 | 90 |  |  | 10 |
| 13 | 80 |  |  | 20 |
| 14 | 70 |  |  | 30 |
| 15 | 60 |  |  | 40 |

Sample Preparation: Formulations CE1-CE2 and 1-15

Each of Formulations CE1-CE2 and 1-15 was prepared according to the weight ratios in Table 3. Each Formulation was first blended in a plastic bag and gravimetrically fed into a 27 mm twin screw extruder (52:1 L:D, commercially available from ENTEK™ Extruders, Lebanon, OR). Compounding was performed using the following temperature profile in zones 1-13: 100, 350, 400, 400, 400, 400, 400, 400, 400, 400, 400, 400, and 400 degrees Fahrenheit (about 38, 177, 204, 204, 204, 204, 204, 204, 204, 204, 204, 204, and 204 degrees Celsius, respectively). The extruder's screw speed was about 300 rpm, and the output rate was about 10 kg/hr. The mixture was then extruded onto an air cooled belt conveyor, pelletized into approximately 2.5 mm×2.5 mm cylindrical pellets, and collected in a plastic bag.

Example 1: Filament Preparation of Formulations 6

Filament preparation for Formulation 6 was conducted according to the following procedure. The pellets from Formulations 6 were dried for four hours at 90° C. and then extruded using a 1.75" single screw extruder with barrier screw, 24:1 L:D at a screw speed of 20 rpm, a temperature profile of 200° C. for all extruder zones, and an output rate of 10 kg/hr. Filament was extruded through a round die, air cooled, and wound onto a spool with a 3" core.

Example 2: Ultimaker Filament Formulation 6

A 2.85 mm thick filament of Formulation 6, produced according to Example 1, was printed on a ULTIMAKER 5S™ printer (commercially available from Ultimaker Inc.) using the following conditions. The filament was directly fed into the Ultimaker extruder, the temperature for which was 230° C.

Dissolution Method Test 1: Formulations 1-15

For each of Formulations 1-15, a 2.5 gram pellet sample was place in about 50 mL of deionized water at about 85° C. The dissolution time was reported at the time when the sample was completely dissolved, such that there were no observable pellets. The results of are provided in Table 4.

TABLE 4

DISSOLUTION TEST METHOD 1 RESULTS

| Formulation | Dissolution Rate (mg/min) |
|---|---|
| 1 | 60 |
| 2 | 65 |
| 3 | 70 |
| 4 | 70 |
| 5 | 80 |
| 6 | 80 |
| 7 | 85 |
| 8 | 90 |
| 9 | 100 |
| 10 | 105 |
| 11 | 25 |
| 12 | 23 |
| 13 | 22 |
| 14 | 17 |
| 15 | 16 |

The data in Table 4 shows that the dissolution rate of Formulations 1-10 (PVOH-co-PVP/trehalose) increased as the weight percentage of trehalose in a formulation increased. The dissolution rate of Formulations 11-15 (PVOH-co-PVP/inositol), however, decreased as the weight percentage of inositol in a formulation increased.

DSC/TGA Characterization

Differential scanning calorimetry (DSC) using ASTM standard 3418-12—Standard Test Method for Transition Temperatures and Enthalpies of Fusion and Crystallization of Polymers by Differential Scanning Calorimetry, ASTM E1356-08—Standard Test Method for Assignment of the Glass Transition Temperatures by Differential Scanning Calorimetry, and thermal gravimetric analysis (TGA) study using ASTM E2550-11—Standard Test Method for Thermal Stability by Thermogravimetry studies were performed on Formulations 1-15. All samples were heated from room temperature to 300° C. at a ramp rate of 10° C./min in air.

Table 5 shows results of this characterization, specifically key DSC glass and melting transitions (Tg and Tm), and decomposition temperature.

TABLE 5

DSC ON FORMULATION 6 FILAMENT

| Formulation | Glass Transition Temperature (° C.) | Melting Temperature (° C.) | Decomposition Temperature (° C.) |
|---|---|---|---|
| 1 | 82 | 194 | 275 |
| 2 | 83 | 192 | 275 |
| 3 | 84 | 190 | 275 |
| 4 | 85 | 188 | 275 |
| 5 | 85.5 | 186 | 275 |
| 6 | 86 | 184 | 275 |
| 7 | 87 | 182 | 275 |
| 8 | 88 | 180 | 275 |
| 9 | 90 | 179 | 275 |
| 10 | 91 | 178 | 275 |
| 11 | 43 | 189 | 269 |
| 12 | 45 | 190 | 273 |
| 13 | 51 | 191 | 276 |
| 14 | 53 | 190 | 279 |
| 15 | 55 | 221 | 286 |

The data in Table 5 for formulations 1-10 shows trending in the glass transition temperatures wherein increasing sugar content increases the glass transition temperatures, and trending in melt transition temperatures wherein increasing sugar content decreases the melt transition temperatures. The data in Table 5 for formulations 11-15 shows trending in the glass transition temperatures wherein increasing sugar alcohol content increases the glass transition temperatures, trending in melt transition temperatures wherein increasing sugar alcohol content increases the melt transition temperatures, and trending in the decomposition temperatures wherein increasing sugar alcohol content increases the thermal decomposition temperature.

Impact and Bend Radius Characterization

Notched and unnotched izod impact test were performed on injection molded samples at barrel temperatures 375-425 degrees Fahrenheit and mold temperatures of 100-150 degrees Fahrenheit. Samples of Formulations CE1, CE2, 1, and 6 were injection molded and tested per ASTM D256-10 (notched Izod impact) and ASTM D4812-11 (unnotched Izod impact). Table 6 shows the results of the impact testing.

Samples of Formulations CE1, CE2, 1, and 6 were subjected to the Bend Radius Test. The failure bend radius was determined on 2.85 mm extruded filament of these Formulations. The filaments were extruded using the following conditions: barrel temperatures of 190-205 degrees Celsius; a die temperature of 190-195 degrees Celsius; a screw RPM of 14.7; and pressure of 2000 psi. A filament of each of these Formulations was clamped into opposing clamps on tensile testing machine, with center loop held together by a ⅜" ID washer. The failure bend radius was then calculated, as shown in Table 7.

TABLE 6

IMPACT PROPERTIES OF CE1, CE2 AND SAMPLES 1 AND 6

| Sample | Notched Izod Impact (ft-lbs/in) | Unnotched Izod Impact (ft-lbs/in) |
|---|---|---|
| CE1 | 0.37 | 2.06 |
| CE2 | 0.37 | 1.27 |
| 1 | 0.45 | 16.29 |
| 6 | 0.45 | 4.25 |

TABLE 7

BEND RADIUS PROPERTIES OF CE1, CE2 AND SAMPLES 1 AND 6

| Sample | Failure Bend Radius (in) |
|---|---|
| CE1 | 2.4 |
| CE2 | 2.4 |
| 1 | 0.8 |
| 6 | 1.0 |

The date in Table 6 shows that the PVOH-co-PVP/trehalose compositions exhibited higher notched and unnotched Izod impact values than the BVOH/trehalose compositions at the same sugar loading levels, indicating that the former compositions are tougher than the latter compositions at the same loading levels. The data in Table 7 shows that the PVOH-co-PVP/trehalose compositions exhibited smaller bend radius failure values than the BVOH/trehalose compositions at the same loading levels, illustrating that the latter compositions were tougher than the former.

Having thus described particular embodiments, those of skill in the art will readily appreciate that the teachings found herein may be applied to yet other embodiments within the scope of the claims hereto attached.

What is claimed is:

1. A water soluble polymer composition comprising:
   a water soluble polymer comprising polyvinyl alcohol-co-vinylpyrrolidinone copolymer; and
   a sugar;
   wherein the water soluble polymer and the sugar are substantially miscible;
   wherein the water soluble polymer and the sugar are melt processable and form the water soluble polymer composition;
   wherein the water soluble polymer composition is substantially dry; and
   wherein the sugar is inositol.

2. The water soluble polymer composition of claim 1, wherein the water soluble polymer composition is substantially stable at a build chamber temperature of at least about 100° C.

3. The water soluble polymer composition of claim 1, wherein the water soluble polymer composition is substantially stable at a build chamber temperature of at least about 140° C.

4. The water soluble polymer composition of claim 1, wherein the water soluble polymer composition is substantially stable at a build chamber temperature of at least about 150° C.

5. The water soluble polymer composition of claim 1, wherein the water soluble polymer composition is substantially stable at a build chamber temperature of at least about 170° C.

6. The water soluble polymer composition of claim 1, wherein the water soluble polymer composition is substantially stable at a build chamber temperature of at least about 190° C.

7. The water soluble polymer composition of claim 1, wherein the water soluble polymer composition is substantially stable at a build chamber temperature of at least about 210° C.

8. The water soluble polymer composition of claim 1, further comprising one or more additives or polymers.

9. The water soluble polymer composition of claim 1, wherein the water soluble polymer composition is semi-crystalline.

10. The water soluble polymer composition of claim 1, wherein the water soluble polymer composition forms a feedstock.

11. The water soluble polymer composition of claim 10, wherein the feedstock is a filament.

12. The water soluble polymer composition of claim 1, wherein the water soluble polymer composition exhibits a notched IZOD impact value of at least about 0.37 ft-lbs/in (about 19.75 J/m) as measured in accordance with ASTM standard D256-10.

13. The water soluble polymer composition of claim 1, wherein the water soluble polymer composition exhibits a notched IZOD impact value of at least about 0.45 ft-lbs/in (about 24.02 J/m) as measured in accordance with ASTM standard D256-10.

14. The water soluble polymer composition of claim 1, wherein the water soluble polymer composition exhibits an unnotched IZOD impact value of at least about 1.27 ft-lbs/in (about 67.79 J/m) as measured in accordance with ASTM standard D4812-11.

15. The water soluble polymer composition of claim 1, wherein the water soluble polymer composition exhibits an unnotched IZOD impact value of at least about 2.06 ft-lbs/in (about 109.96 J/m) as measured in accordance with ASTM standard D4812-11.

16. The water soluble polymer composition of claim 1, wherein the water soluble polymer composition exhibits a failure bend radius of about 2.4 inches (about 6.096 cm) or less as measured in accordance with the Bend Radius Test.

17. The water soluble polymer composition of claim 1, wherein the water soluble polymer composition exhibits a failure bend radius of about 1.0 inch (about 2.54 cm) or less as measured in accordance with the Bend Radius Test.

18. The water soluble polymer composition of claim 1, wherein the water soluble polymer composition exhibits a failure bend radius of about 0.8 inches (about 2.032 cm) or less as measured in accordance with the Bend Radius Test.

19. The water soluble polymer composition of claim 1, wherein the water soluble polymer composition is substantially stable at a build chamber temperature of up to about 300° C.

20. A water soluble support composition comprising:
a water soluble polymer composition having a dissolution rate of at least 25 mg/min as measured in accordance with Dissolution Test Method 1 and being substantially stable at a build chamber temperature of at least 100° C.;
wherein the water soluble polymer composition comprises a water soluble polymer and a sugar;
wherein the water soluble polymer and the sugar are substantially miscible;
wherein the water soluble polymer comprises polyvinyl alcohol-co-vinylpyrrolidinone copolymer; and
wherein the sugar is inositol.

21. The water soluble support composition of claim 20, wherein the water soluble polymer composition is substantially stable at a build chamber temperature of at least about 140° C.

22. The water soluble support composition of claim 20, wherein the water soluble polymer composition is substantially stable at a build chamber temperature of at least about 150° C.

* * * * *